US012099908B2

United States Patent
Krishnamurthy et al.

(10) Patent No.: US 12,099,908 B2
(45) Date of Patent: *Sep. 24, 2024

(54) UPDATING TRAINING EXAMPLES FOR ARTIFICIAL INTELLIGENCE

(71) Applicant: Microsoft Technology Licensing, LLC, Redmond, WA (US)

(72) Inventors: Jayant Sivarama Krishnamurthy, Berkeley, CA (US); Dmitrij Petters, Sammamish, WA (US); Joshua James Clausman, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,807

(22) Filed: Jan. 26, 2023

(65) Prior Publication Data

US 2023/0169405 A1 Jun. 1, 2023

Related U.S. Application Data

(63) Continuation of application No. 16/748,700, filed on Jan. 21, 2020, now Pat. No. 11,574,246.

(51) Int. Cl.
*G06N 20/00* (2019.01)
*G06F 16/33* (2019.01)
*G06F 40/279* (2020.01)

(52) U.S. Cl.
CPC ......... *G06N 20/00* (2019.01); *G06F 16/3344* (2019.01); *G06F 40/279* (2020.01)

(58) Field of Classification Search
None
See application file for complete search history.

(56) References Cited

U.S. PATENT DOCUMENTS 8,250,009 B1 * 8/2012 Breckenridge ........ G06N 20/00
706/14
8,595,154 B2 * 11/2013 Breckenridge ........ G06N 20/00
706/12
(Continued)

FOREIGN PATENT DOCUMENTS

CN    101689185 A    3/2010
CN    105229635 A    1/2016
(Continued)

OTHER PUBLICATIONS

Li, et al., "API code search based on crowdsourced Q&A information", Computer applications and software, vol. 35, Issue 7, Jul. 2018, pp. 43-51.
(Continued)

*Primary Examiner* — Tuyetlien T Tran
(74) *Attorney, Agent, or Firm* — Alleman Hall & Tuttle LLP

(57) ABSTRACT

Techniques for adapting previously-annotated training examples into updated training examples for training a machine learning model are disclosed. One example includes a computer program that recognizes a find expression, a replacement expression, and a filtering constraint in which the filtering constraint distinguishes a subset of previously-annotated training examples from others of the previously-annotated training examples. An instance of the find expression is identified by the computer program within the subset of the previously-annotated training examples that were identified among the previously-annotated training examples based on the filtering constraint. The instance of the find expression identified within the subset of the previously-annotated training examples is replaced by the computer program with an instance of the replacement expression to obtain an updated subset of training examples. The
(Continued)

updated subset of training examples is output by the computer program, which may be used for training a machine learning model.

20 Claims, 7 Drawing Sheets

(56) References Cited

U.S. PATENT DOCUMENTS

| | | | | |
|---|---|---|---|---|
| 10,573,312 | B1* | 2/2020 | Thomson | G10L 15/22 |
| 10,943,185 | B1* | 3/2021 | Witting | G06F 9/451 |
| 11,556,746 | B1* | 1/2023 | Dasgupta | G06N 5/04 |
| 11,853,391 | B1* | 12/2023 | Ladkat | G06N 20/00 |
| 2005/0135568 | A1* | 6/2005 | Qiu | H04M 11/062 |
| | | | | 379/27.01 |
| 2010/0268536 | A1 | 10/2010 | Suendermann | |
| 2012/0191630 | A1* | 7/2012 | Breckenridge | G06N 20/00 |
| | | | | 706/12 |
| 2016/0350672 | A1* | 12/2016 | Snyder | G06N 20/00 |
| 2017/0323216 | A1* | 11/2017 | Fano | G06N 20/00 |
| 2018/0144465 | A1* | 5/2018 | Hsieh | G16H 30/40 |
| 2018/0253660 | A1 | 9/2018 | Liu | |
| 2018/0307741 | A1* | 10/2018 | Kida | G06N 3/08 |
| 2018/0330280 | A1 | 11/2018 | Erenrich | |
| 2018/0373998 | A1* | 12/2018 | Tsuchida | G06N 20/00 |
| 2019/0066660 | A1* | 2/2019 | Liang | G10L 15/183 |
| 2019/0102692 | A1* | 4/2019 | Kwant | G06F 18/2411 |
| 2019/0237061 | A1 | 8/2019 | Rusak et al. | |
| 2019/0244601 | A1 | 8/2019 | Rusak | |
| 2019/0294999 | A1* | 9/2019 | Guttmann | G06F 18/217 |
| 2019/0378044 | A1* | 12/2019 | Jeffery | G06N 20/00 |
| 2019/0385043 | A1* | 12/2019 | Choudhary | G06F 13/4213 |
| 2020/0090368 | A1* | 3/2020 | Szeto | G02B 27/0172 |
| 2020/0143114 | A1* | 5/2020 | Dua | G06F 3/0481 |
| 2020/0380258 | A1* | 12/2020 | Yu | G06V 10/7788 |
| 2020/0382968 | A1* | 12/2020 | Gupta | H04L 41/145 |
| 2021/0064937 | A1* | 3/2021 | Nguyen | G06V 20/20 |
| 2021/0090694 | A1* | 3/2021 | Colley | G16H 15/00 |
| 2021/0110248 | A1* | 4/2021 | Midkiff | G06Q 10/063112 |
| 2021/0133580 | A1* | 5/2021 | Mehl | G06N 5/01 |
| 2021/0150332 | A1* | 5/2021 | Truong | G06N 3/044 |
| 2021/0192684 | A1* | 6/2021 | Pardeshi | G06N 3/045 |
| 2021/0209488 | A1* | 7/2021 | Li | G06N 3/063 |
| 2021/0353166 | A1* | 11/2021 | Sirendi | G16H 50/20 |
| 2021/0366618 | A1* | 11/2021 | Schoedl | G16H 50/70 |
| 2021/0398674 | A1* | 12/2021 | Kim | G16H 50/30 |
| 2022/0050867 | A1* | 2/2022 | Waller | G06V 20/70 |
| 2022/0156577 | A1* | 5/2022 | Jha | G06N 3/08 |
| 2022/0176248 | A1* | 6/2022 | Chang | A63F 13/69 |

FOREIGN PATENT DOCUMENTS

| | | |
|---|---|---|
| CN | 109791631 A | 5/2019 |
| CN | 110050281 A | 7/2019 |
| CN | 110580290 A | 12/2019 |

OTHER PUBLICATIONS

Office Action Received for Chinese Application No. 202080094068. 4, mailed on Mar. 18, 2024, 16 pages (English Translation Provided).

Xu, et al., "Research on Active Learning Approach in Machine Learning", China Academic Journal Electronic Publishing House, Issue 16, Jun. 10, 2016, pp. 234-235.

Summons to attend oral proceedings pursuant to Rule 115(1) EPC, Received for European Application No. 20829149.2, mailed on Dec. 18, 2023, 8 pages.

Office Action Received for Chinese Application No. 202080094068. 4, mailed on Aug. 7, 2024, 04 pages (English Translation Provided).

* cited by examiner

UPDATING TRAINING EXAMPLES FOR ARTIFICIAL INTELLIGENCE

CROSS REFERENCE TO RELATED APPLICATIONS

This application is a continuation of U.S. patent application Ser. No. 16/748,700, filed Jan. 21, 2020, the entirety of which is hereby incorporated herein by reference for all purposes.

BACKGROUND

Computers may be trained using training examples that link an action that is performed in response to a particular input. As one example, conversational computing systems that utilize machine learning or other artificial intelligence techniques may be trained to respond to a variety of human utterances. For example, a conversational computing system may be trained to respond to a user speaking the question, "what'll the weather be like tomorrow?" by querying a network-accessible weather service for tomorrow's weather report, and outputting a response utterance based on the weather report that includes a textual summary for the user that includes, "tomorrow will be cloudy with a high of 74 degrees." Training of such conversational computing systems can be time consuming and challenging to implement. For example, such training may rely on thousands or more training examples that are labeled by human annotators. Some training systems rely on highly skilled human annotators that are capable of labeling training data with annotations having a defined format and syntax.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Techniques for adapting previously-annotated training examples into updated training examples for training a machine learning model are disclosed. One example includes a computer program that recognizes a find expression, a replacement expression, and a filtering constraint in which the filtering constraint distinguishes a subset of previously-annotated training examples from others of the previously-annotated training examples. An instance of the find expression is identified by the computer program within the subset of the previously-annotated training examples that were identified among the previously-annotated training examples based on the filtering constraint. The instance of the find expression identified within the subset of the previously-annotated training examples is replaced by the computer program with an instance of the replacement expression to obtain an updated subset of training examples. The updated subset of training examples is output by the computer program, which may be used for training a machine learning model.

DETAILED DESCRIPTION

Figure 1:
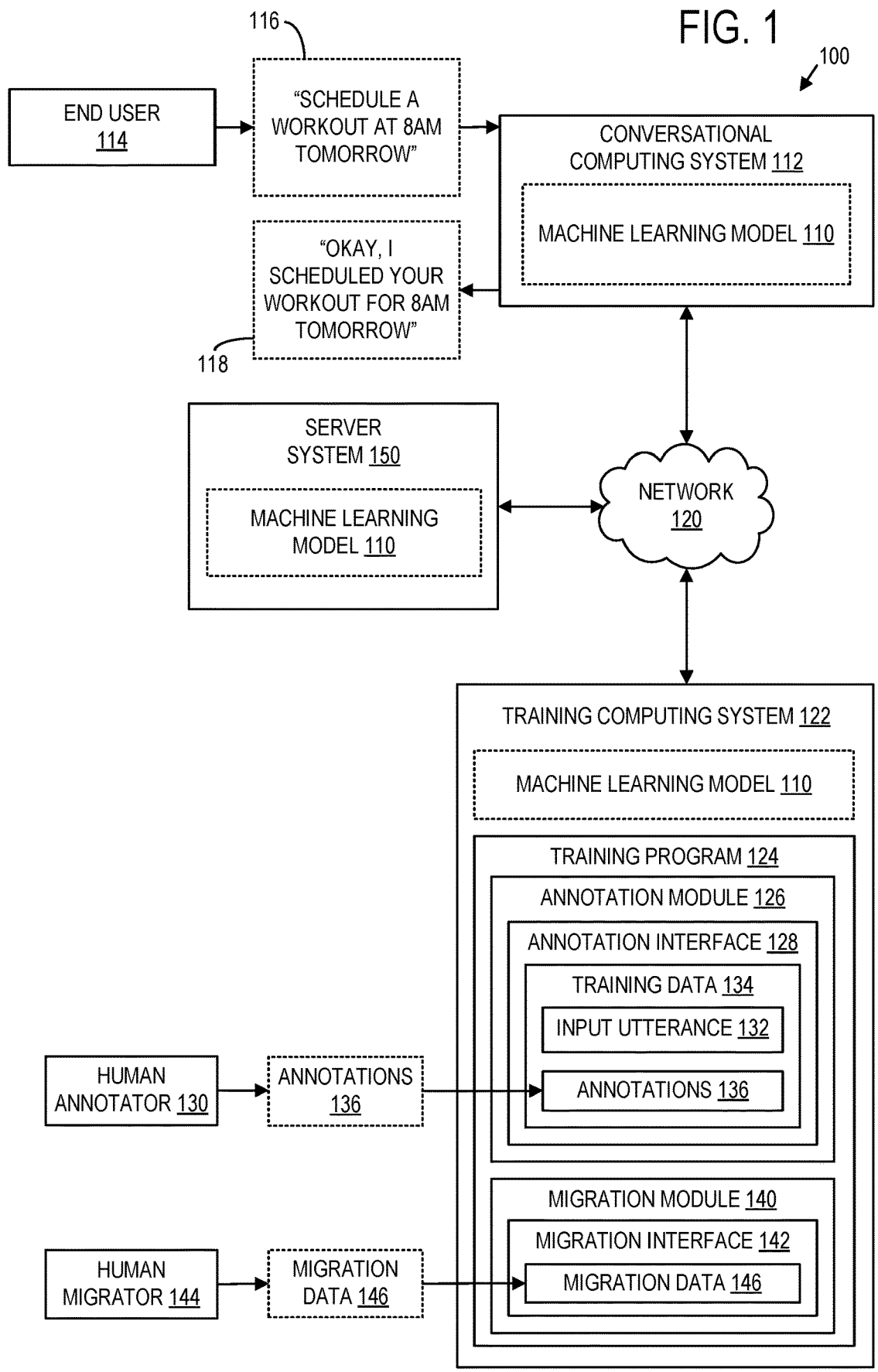
FIG. 1 shows a schematic diagram of an example computing environment for training a machine learning model of a conversational computing system.

Computers, such as artificial intelligence systems, may be trained with training data including many human-annotated training examples. Each annotated training example may include an example input to the computer (e.g., a human utterance) and a desired annotated response by the computer to the input (e.g., execution of a particular data-flow program labeled by a human annotator) that together form an input/response pair. Some training examples may include a sequence of multiple input/response pairs, such as in the case of an example training dialogue between an example user and a conversational computing system. As machine learning models increase in sophistication and capability, it is conceivable that a set of training data could include millions or more human-annotated training examples, each of which adhere to a strict format and/or syntax.

Creating human-annotated training examples can be incredibly time consuming and may rely on highly skilled human annotators. The act of labeling training data by human annotators can be a difficult task and error-prone for the human annotators, often relying on specialized training in creating computer-executable plans according to a set of rules. For example, human annotators may be required to have extensive knowledge in a data-flow programming language having rigorous formatting and syntax requirements. This can present a significant bottleneck in the model training process, as it can take significant resources to recruit and train a sufficient group of human annotators to train a machine learning model, particularly where large quantities of annotated training examples are used to adequately train the machine learning model. A challenge likely to be confronted by system developers is maintaining correct annotations in a set of training data as the underlying data-flow programming language or other format/syntax specific aspects of the training data evolves over time, particularly with large sets of training data.

There are several reasons why annotations within a set of training data may need to be changed by system developers. First, because training examples are annotated by humans, the training examples may contain inconsistencies or inaccuracies that are later identified by developers or end users, and which need to be corrected. These inconsistencies or inaccuracies may result from human annotators having subtly different interpretations of an utterance. For example, an input utterance such as, "when does that start?" could be interpreted by a human annotator as a request for either a date and a time, or just a time. Inconsistencies and inaccuracies in training data have a negative impact on the training process and may need to be corrected, for example, by developers choosing a specific interpretation of an input utterance and enforcing that interpretation across a set of training data.

Second, the underlying capabilities of the computing system or the programming syntax and/or formatting may change, for example, by either replacing or superseding existing syntax or capabilities. As one example, the computing system may be provided with a new, more powerful application programming interface (API) that can be queried in response to particular input utterances. To address this change, utterances annotated with the previous API may be migrated to the new API to provide the system with new capabilities. As another example, the programming syntax and/or formatting utilized by the system and its developers may be changed at a time after annotations that contain program fragments utilizing an earlier syntax and/or formatting have been applied to training examples. As an illustrative example, a previously-annotated training example may be initially labeled with the expression "Describe{target: [event]: Event.get(Path(start)).get(Path(time))}" as part of a program fragment contained within an annotation of a training example that is used within the context of event-related data. At a later time, the syntax and/or formatting used to perform the intended function (e.g., determining the start time of an event) may have changed to "Describe{target: [event].get(Path(start))}". Addressing the above change to the syntax and/or formatting may be particularly challenging where the change to the system is only to apply in certain contexts (e.g., event-related data), but not within other contexts.

Third, response expectations of end users that change over time, differ by geographic region, or differ from those of developers may need to be addressed in the training data. As one example, developers may recognize after development of a set of annotated training data that when an end user asks the system, "what will the weather be like next Friday?", that the end user intends for the system to respond with the weather for a Friday after the immediately approaching Friday, rather than responding with the weather for the immediately approaching Friday. However, this expectation by end users may apply only in certain situations, such as where the current day is not the same day of the week (e.g., Friday) queried by the end user. For example, end users may expect that the above input utterance, "what will the weather be like next Friday?" return the weather for the immediately approaching Friday if the current day is Friday. Thus, developers may desire to update only certain portions of the training data to include annotations that incorporate this functionality. This example seeks to illustrate the intricacies and complexities of capturing the intent of human speech within training data, which may at times be arbitrary, geographical dependent, and non-static as societal use of language adapts and as training data is improved.

The above challenges may be addressed, at least in part, by adapting previously-annotated training examples into updated training examples using the techniques disclosed herein. One example includes a computer program that recognizes, within an entirety of the previously-annotated training examples or within a specific subset of the previously annotated training examples, instances of a find expression. A filtering constraint can be used to distinguish the specific subset of previously-annotated training examples from others of the previously-annotated training examples. An instance of the find expression is identified by the computer program within the specific subset of the previously-annotated training examples, and is replaced by the computer program with an instance of a replacement expression to obtain an updated subset of training examples. This replacement may be carried out for every instance of the find expression identified within the specific subset of the previously-annotated training examples.

The filtering constraint in this example enables a user to target particular subregions of a set of training data within which instances of the find expression are to be replaced with instances of the replacement expression, while excluding other subregions of the training data from such replacement operations. The filtering constraint may define a combination of one or more filters and associated criteria that are to be applied to the training data when performing a migration from previously-annotated training data to updated training data. Thus, the filtering constraint provides the user with control over the scope of the migration between two sets of training data.

Some migrations of large sets of training data may take hours or days of computer runtime to complete. To provide the user with the ability to test portions of a migration within a shorter computer runtime, a preview feature is provided that updates a previewed portion of the training data that is smaller than the specific subset of training examples that are to be updated by the migration. The size of this previewed portion of the training data may be defined by the user through the use of a preview constraint. In combination with this preview constraint, the filtering constraint may be set by the user to be narrower than the migration to further reduce the computer runtime for generating the preview. The preview enables the user to test portions of the migration and review errors introduced by replacement expressions, the magnitude or extent of replacements within training data, and whether replacements satisfy the intended purpose of the migration before applying the migration over the entire set of training data.

Following migration of the entire set of training data, the updated subset of training examples may be used in combination with previously-annotated training examples that were unchanged by the migration for training a machine learning model.

FIG. 1 shows a schematic diagram of an example computing environment 100 for training a machine learning model 110 of a conversational computing system 112. While machine learning model 110 is described within the context of conversational computing system 112, it will be understood that some or all of the techniques disclosed herein may be used to adapt training data for other types of machine learning models.

Conversational computing systems, such as example conversational computing system 112, enable human users to interact with computers in a more natural manner. A properly trained conversational computing system is able to process natural user interactions such as spoken or typed user utterances, without requiring the end user to use a particular syntax defined by a computer programming language. This allows end users to use natural language when addressing a computer.

For example, a user may interact with a computer using natural language by asking the computer to answer a question or by providing a command to the computer. In response, the conversational computing system is trained to automatically perform one or more actions, such as answering questions or otherwise assisting a user (e.g., reporting today's weather forecast in response to the human saying or typing "what is the weather like?"). The conversational computing system may respond to the user request with any suitable set of computer operations, such as outputting synthesized speech via a speaker and/or interacting with other computer services via APIs to find search results, make purchases, schedule appointments, and/or control peripheral devices.

Conversational computing system 112 may have any suitable hardware configuration and form factor. As examples, a conversational computing system may be a laptop computer, desktop computer, smartphone, tablet, media center, smart speaker device, personal assistant device, smart watch, mixed reality device, Internet of Things (IoT) device (e.g., smart thermostat, light controller, security camera, appliance), or may be distributed across two or more computing devices.

Conversational computing systems may be configured to respond to various user interaction events. In the example of FIG. 1, an end user 114 provides an input 116 to conversational computing system 112 in the form of an utterance, "schedule a workout at 8 AM tomorrow." Examples of user interaction events include user utterances in the form of speech and/or text, button presses, network communication events (e.g., receiving a result of an API call), and/or gestures input to the computing system via touch interfaces or body-tracking imaging systems. More generally, user interaction events include any occurrences that may be relevant to user interaction and that are detectable by a computing system, for example via input hardware (e.g., microphones, cameras, keyboards, touch-screens, handheld controllers), communication hardware, and the like. Such user interaction events may be represented in a computer-readable format, such as a text string generated by a speech-to-text interpreter or screen coordinate values associated with touch inputs, as examples.

Conversational computing systems may be configured to perform any suitable actions to assist a user. Again, using the example of FIG. 1, after end user 114 provides input 116, conversational computing system 112 performs an action that includes generating a response 118 in the form of a response utterance, "okay, I scheduled your workout for 8 AM tomorrow." Examples of actions that may be performed by a computing system include performing computations, controlling other computers and/or hardware devices (e.g., by invoking an API), communicating over communications networks (e.g., to invoke an API), receiving additional user input (e.g., in the form of any detectable input event), and/or providing output (e.g., in the form of displayed text, synthesized speech, or other human perceivable output). More generally, actions performed by a computing system may include any behaviors that a computer system is configured to perform. Other examples of actions include controlling electronic devices (e.g., turning on/off lights in a user's home, adjusting a thermostat, operating an appliance, and/or playing multimedia content via display/speakers), interacting with third-party services (e.g., invoking an API to schedule a ride via a ride-hailing service and/or ordering food/packages via a delivery service), and/or interacting with other computer systems (e.g., to access information from a website or database, send a communication such as an email, review inbound communications addressed to a user, and/or access a user's schedule in a calendar program).

Actions performed by a computing system in response to an input may be in accordance with a computer-executable plan. The term "plan" is used herein to refer to any suitable representation of steps that may be taken by a computer in order to perform a corresponding action. For example, a computer-executable plan may include computer-executable code (e.g., a program fragment) configured to cause a computer to perform computational steps for carrying out a corresponding action. As one example, a computer-executable plan may include computer-executable bytecode in a data-flow programming language (e.g., as used by conversational computing system 112 or in any other suitable programming language). Alternately or additionally, a computer-executable plan may include any other suitable data for representing computational steps and data flow and/or control flow related to computational steps, including any suitable computer functions and/or operations, arranged in any suitable sequence, tree, graph, and/or hypergraph. A conversational computing system that enacts a plan (e.g., by generating and/or at least partially executing the plan) may be able to automatically employ complex conversational approaches in response to an input event. For example, the plan may enable the conversational computing system to take initiative to effectively handle the input event, ask appropriate questions of a user (e.g., to seek clarification if there is an ambiguity, and/or to seek confirmation before automatically making a decision), describe the results of enacting a plan, and/or describe the process of obtaining the results (e.g., describing steps in the plan itself). Accordingly, by recognizing various input events and in response, performing relevant actions, conversational computing systems enable users to use conversation, gesture, and other modes of expression to control a computer to perform any suitable tasks.

As further shown in FIG. 1, conversational computing system 112 is communicatively coupled with a communications network 120, which may be any suitable communications network, such as the Internet. Also coupled to communications network 120 is a training computing system 122 configured to implement a training program 124 that is operable to train a machine learning model, such as machine learning model 110. Training program 124 includes annotation module 126 having an annotation interface 128. In an example, a human annotator 130 labels an input utterance 132 of training data 134 by providing annotations 136 to training computing system 122 via annotation interface 128. For example, the annotation interface may present input utterance 132, and the human annotator may provide annotations 136 that define a computer-executable plan that includes a corresponding action. The input utterance 132 and annotations 136 may be stored as labeled training data 134 as an example of an annotated training example that is used to train machine learning model 110. In at least some examples, training computing system 122 may also implement the machine learning model, such that the training computing system may dynamically generate computer-executable plans in response to queries input via the training program.

As further shown in FIG. 1, training program 124 further includes a migration module 140 having a migration interface 142 operable to migrate training data 134 to an updated version of training data 134 by adapting one or more previously-annotated training examples within the training data to updated training examples. For example, training data 134 containing the updated training examples may be used to train machine learning model 110 via training program 124. In an example, a human migrator 144 provides migration data 146 to training computing system 122 via migration interface 142 to target particular features of the training data that are to be adapted and to define how those features are to be adapted.

Notably, in this example, annotation interface 128 and migration interface 142 are generated via training computing system 122. The annotation interface and migration interface may therefore be rendered by a software application (e.g., training program 124) executed by the training computing system. In the example depicted in FIG. 1, annotation module 126 and migration module 140 form part of the same training program 124. In another example, the annotation interface and migration interface may be generated by a software application executed by a different computing device or computing system from the example depicted in FIG. 1, such as a server system 150, and accessed by training computing system 122 over communications network 120— e.g., via a web interface or API. For example, training computing system 122 may include a communication subsystem, and the annotation interface and/or migration interface may be presented by the server system providing computer-executable interface code to the training computing system over communication network 120 via the communication subsystem. The annotation interface and migration interface may then be presented visually via a display subsystem of the training computing system.

While FIG. 1 depicts migration module 140 and its migration interface 142 as part of the same training program 124 as annotation module 126 and its annotation interface 128, in other examples migration module 140 may form part of a different program as annotation module 126. Similarly, while training computing system 122 is described as providing both annotation interface 128 and migration interface 142, in other examples migration interface 142 may be provided via a different computing device or computing system than annotation interface 128.

In example computing environment 100 of FIG. 1, conversational computing system 112 is in the same local environment as end user 114. In other words, the same computing system records the user utterance, processes the utterance via the machine learning model, and executes a computer-executable plan to perform an action. In other examples, however, the conversational computing system may be remote from the human user—e.g., implemented as server system 150 or distributed between local and remote components of a computing system. Thus, a device in the end user's local environment may record a user input (e.g., utterance) and transmit the user input over communications network 120 to server system 150, which may then provide the user input to an instance of machine learning model 110 executed on the server system. A computer-executable plan generated by the machine learning model may be performed in whole or in part at the server system to generate an action and/or may be transmitted in whole or in part to a device (e.g., 112) located within the local environment of the end user to be carried out by the device.

Furthermore, the conversational computing system and training computing system need not be network connected. For example, training of the machine learning model or migrations of training data performed via the training program may be performed offline. Once the machine learning model is sufficiently trained, the model may be copied to a different computing system—e.g., a personal assistant computing system or a network-accessible server system.

Figure 2:
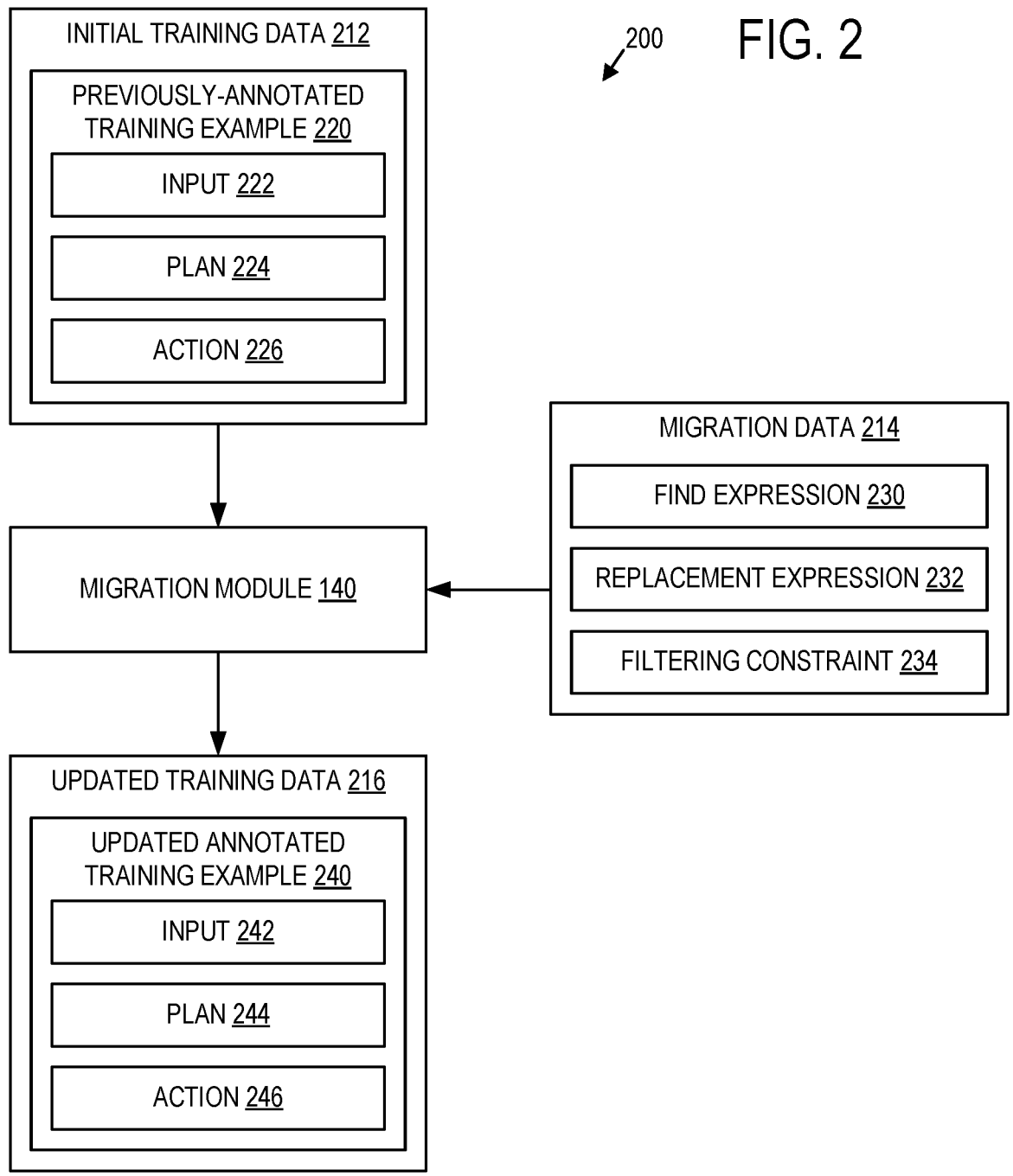
FIG. 2 shows a schematic diagram of an example migration performed by the migration module of the training program of FIG. 1 for adapting a previously-annotated training example to an updated training example.

FIG. 2 shows a schematic diagram of an example migration 200 performed by migration module 140 of training program 124 of FIG. 1. Within the example of FIG. 2, migration module 140 obtains initial training data 212 and migration data 214, adapts initial training data 212 as part of a migration to updated training data 216 based on migration data 214, and outputs updated training data 216 to be used to train a machine learning model.

Initial training data 212 is an example of an instance of training data 134 of FIG. 1 prior to a migration to updated training data 216. Initial training data 212 includes a set of one or more previously-annotated training examples, an example of which is depicted at 220. In an example, these annotated training examples include annotated dialogues of one or more utterances, such as input utterance 132 that is labeled with annotation 136 within FIG. 1. Previously-annotated training example 220 includes an input 222, a plan 224, and a corresponding action 226 that is performed in response to input 222. Input utterance 132 of FIG. 1 is one example of input 222, and annotations 136 of FIG. 1 is one example of plan 224 and its corresponding action 226.

Migration data 214 is an example migration data 146 provided by human migrator 144 via migration interface 142 of FIG. 1. Migration data 214 includes a find expression 230 that is to be replaced within the set of previously-annotated training examples of initial training data 212, a replacement expression 232 that is to replace one or more instances of find expression 230 within the set of previously-identified training examples, and a filtering constraint 234 that distinguishes a subset of the previously-annotated training examples from others of the previously-annotated training examples of initial training data 212. Filtering constraint 234 may include one or more filter criteria that enable a user to target a particular subregion of initial training data 212 for replacement of instances of find expression 230 with instances of replacement expression 232. Aspects of filtering constraint 234 are described in further detail with reference to FIG. 5.

Updated training data 216 is another example of an instance of training data 134 of FIG. 1 following migration from initial training data 212. Updated training data 216 that is output by migration module 140 includes a set of one or more updated annotated training examples, an example of which is depicted at 240. Migration module 140 may replace or augment some or all of input 222, of plan 224, and/or of action 226 based on migration data 230 to obtain and output updated training data 216. As previously described, an action may include performing computations, controlling other computers and/or hardware devices, communicating over communications networks, receiving additional user input, and/or providing output (e.g., a response utterance). Actions performed by a computing system may include any behaviors that a computer system is configured to perform. Updated annotated training example 240 includes an input 242, a plan 244, and a corresponding action 246. In an example, migration module 140 updates plan 222 to plan 242, but does not update input 222 and action 226. Accordingly, in this example, input 242 corresponds to input 222 and action 246 corresponds to input 226. This example describes a scenario in which a developer changes a computer-executable plan within training data without changing the input or corresponding response by the system.

Figure 3:
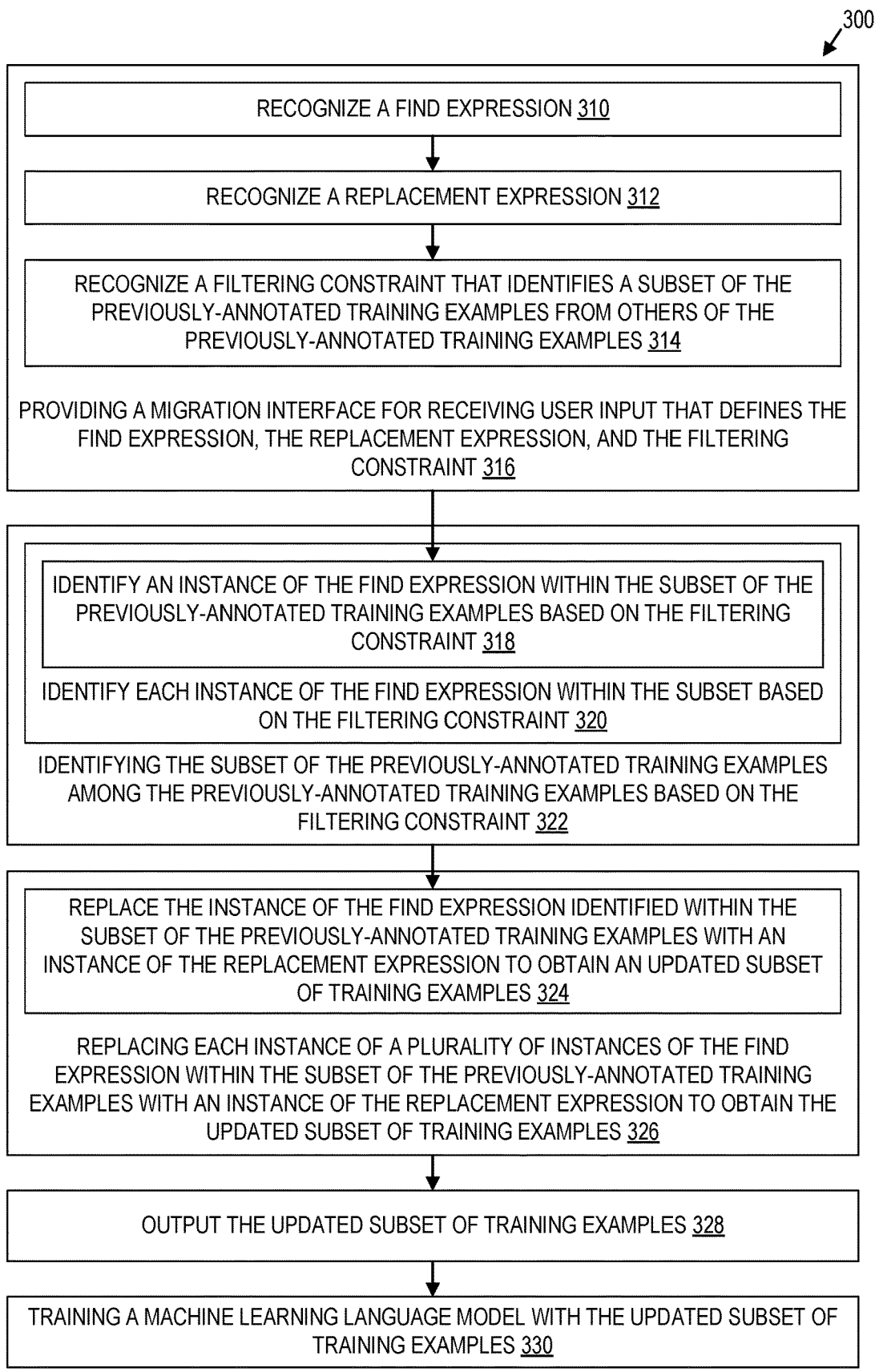
FIG. 3 shows a flow diagram of an example method for adapting previously-annotated training examples into updated training examples for training a machine learning model.

FIG. 3 shows a flow diagram of an example method 300 for adapting previously-annotated training examples into updated training examples for training a machine learning model. In at least some examples, method 300 may be performed by migration module 140 of FIGS. 1 and 2 executed by a training computing system to implement a migration of training data.

In an example implementation of method 300, a previously-annotated training example includes an input utterance that is labeled with an annotation in the form of a program fragment that includes an expression (e.g., find expression 230 of FIG. 2) that is to be replaced by another expression (e.g., replacement expression 232 of FIG. 2). By performing method 300, the previously-annotated training example may be adapted to an updated training example in which the input utterance is labeled with an updated program fragment that includes an updated, replacement expression.

At 310, the method includes recognizing a find expression. In an example, the find expression includes a program fragment within the previously-annotated training examples that is to be replaced as part of a migration to the updated training examples. The find expression may be constructed by a user (e.g., human migrator 144) using a programming language having a defined format and syntax that is usable by a training program to train a machine model. However, in at least some examples, the migration module or training program may parse and translate the programming language used by the user into a different programming language that is usable by the training program to train the machine learning model.

At 312, the method includes recognizing a replacement expression. In an example, the replacement expression includes a program fragment that is to replace one or more instances of the find expression as part of the migration to the updated training examples. The replacement expression may be constructed by a user using the same programming language as the find expression. The replacement expression differs from the find expression, for example, by defining a different plan or action to be performed by a computing system. However, in some examples, the replacement expression may include the find expression or a portion thereof as a component of the replacement expression.

At 314, the method includes recognizing a filtering constraint that distinguishes a subset of the previously-annotated training examples from others of the previously-annotated training examples. The subset of the previously-annotated training examples includes one or more training examples within which instances of the find expression are to be replaced with instances of the replacement expression. Training data that includes the previously-annotated training examples may be formatted according to a particular programming language that defines various subregions that include input utterances (e.g., as metadata), program fragments, and/or other data organized into a data structure that can be interpreted and executed by a computing system. These subregions of the training data may be delineated from each other by syntactic tokens or tags that can be interpreted by the migration module or other program. The filtering constraint recognized at 314 may include or utilize these syntactic tokens or tags to enable a user to target subregions of the training data within which instances of the find expression are to be replaced by instances of the replacement expression.

In at least some examples, recognizing one or more of the find expression, replacement expression, and filtering constraint includes receiving user input via a migration interface (e.g., migration interface 142 of FIG. 1) that defines the find expression, replacement expression, and filtering constraint. Accordingly, the method at 316 may include providing the migration interface (e.g., to a graphical display) by which the find expression, replacement expression, and filtering constraint may be input by a user and recognized by the migration module. An example of a migration interface is described in further detail with reference to FIG. 5 as migration editor interface 500. In some examples, a machine learning model may be trained to recognize and/or recommend one or more of the find expression, replacement expression, and filtering constraint (e.g., based on training data including previous user inputs via the migration interface).

The find expression and/or the replacement expression recognized at 310 and 312, respectively, need not be a verbatim instance of a particular text string, and may instead include one or more wildcards and/or define one or more patterns. These wildcards and/or patterns are identifiable by the migration module, enabling instances of the find expression that are consistent with the wildcard and/or patterns to be replaced with instances of the replacement expression.

At 318, the method includes identifying an instance of the find expression within the subset of the previously-annotated training examples based on the filtering constraint. In an example, some or all of the training examples of the subset include an utterance labeled with a program fragment that includes an instance of the find expression. Accordingly, in at least some examples, the method at 320 includes identifying each instance of the find expression within the subset of the previously-annotated training examples. A matcher or search engine component of the migration module may be used to identify each instance of the find expression within the subset of previously-annotated training examples. The matcher or search engine may utilize an index of the training data in examples where indexing of the training data and training examples is performed prior to performance of method 300.

As part of operations 318 and 320, the method at 322 may include identifying the subset of the previously-annotated training examples among the previously-annotated training examples based on the filtering constraint. As described by the following examples, the subset of the previously-annotated training examples or subregions thereof may be identified based on one or more user-selectable filters and associated criteria of the filtering constraint.

In a first example, the filtering constraint includes a training example identifier or collection of training example identifiers that identify one or more of the previously-annotated training examples. In this example, the subset of previously-annotated training examples may be specifically identified by a user as candidates for migration to updated training examples.

In a second example, the filtering constraint identifies a target subregion of the previously-annotated training examples where an instance of the find expression is to be present to be identified as part of the subset. In this example, the subset of the previously-annotated training examples each include at least one instance of the find expression within the target subregion of the previously-annotated training example of the subset. The target subregion may include a preamble subregion or a program fragment subregion that labels an utterance of a previously-annotated training example. Example subregions of a training example are described in further detail with reference to FIG. 4.

In a third example, the filtering constraint identifies a target subregion of the previously-annotated training examples and a keyword or other suitable criteria. In this example, the subset of the previously-annotated training examples each include the keyword or meet the criteria within the target subregion of the previously-annotated training example of the subset. For example, the target subregion may include an utterance subregion of the previously-annotated training examples, and the keyword may form part of an utterance of the utterance region. In contrast to the second example discussed above, the subregion containing the keyword may differ from, but is linked to a subregion containing an instance of the find expression that is to be replaced within format and syntax of the training data. For example, the instance of the find expression may be within a program fragment subregion that labels an utterance region containing the keyword.

At 324, the method includes replacing an instance of the find expression identified within the subset of the previously-annotated training examples with an instance of the replacement expression to obtain an updated subset of training examples. In at least some examples, the method at 326 may include replacing each instance of the find expression within the subset of the previously-annotated training examples with an instance of the replacement expression. In examples where the filtering constraint includes a target subregion, such as a preamble subregion or a program fragment subregion that labels an utterance, each instance of the find expression may be replaced within the target subregion of the subset of previously-annotated training examples with an instance of the replacement expression. For other examples where the filtering constraint includes a keyword or meets other suitable criteria, and a target subregion includes an utterance subregion, each instance of the find expression may be replaced with an instance of the replacement expression within a different subregion (e.g., a program fragment) of each previously-annotated training example of the subset that is associated with the target subregion containing the keyword or that meets the criteria.

At 328, the method includes outputting the updated subset of training examples. In an example where a previously-annotated training example of the subset includes an utterance labeled with a program fragment that includes an instance of the find expression, the updated training example of the subset includes the utterance labeled with an updated program fragment including an instance of the replacement expression that replaces the instance of the find expression. In at least some examples, the updated subset of training examples output at 328 may be accompanied by previously-annotated training examples that were not part of the subset that was updated. The updated subset of training examples may be stored in a storage machine (e.g., as updated training data) and/or passed to a process of a training program for subsequently training a machine learning model.

At 330, the method includes training a machine learning model with the updated subset of training examples. In at least some examples, the method at 330 may include training the machine learning model in combination with the previously-annotated training examples that were not part of the subset that was updated, such as where the machine learning model was not previously trained using the previously-annotated training examples.

Figure 4:
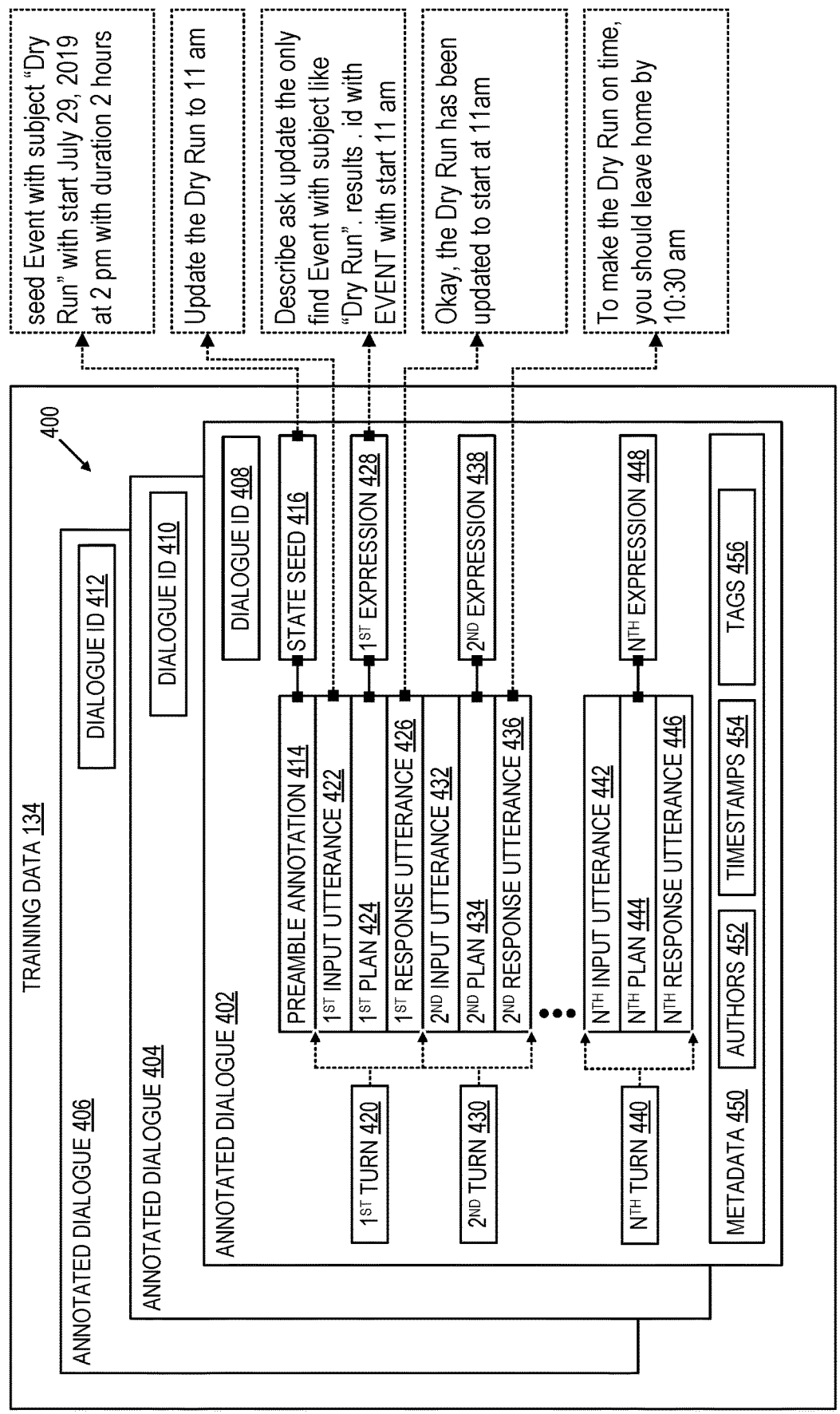
FIG. 4 shows a schematic diagram of an example data structure of the training data of FIG. 1.

FIG. 4 shows a schematic diagram of an example data structure 400 of training data 134 of FIG. 1. In this example, training data 134 includes a plurality of training examples in the form of annotated dialogues 402, 404, 406, etc. having respective dialogue identifiers 408, 410, 412, etc. Features of these annotated dialogues are described in further detail with respect to example annotated dialogue 402.

Each annotated dialogue may include a plurality of subregions. An example subregion of annotated dialogue 402 includes a preamble subregion containing a preamble annotation 414. Preamble annotation 414 may include a program fragment that includes a state seed 416 that defines an initial state for one or more annotated utterances of the annotated dialogue. Preamble annotation 414 is one example of annotations 136 of FIG. 1. In the example of FIG. 4, state seed 416 included in preamble annotation 414 includes the expression: "seed Event with subject "Dry Run" with start Jul. 29, 2019 at 2 pm with duration 2 hours", which can be translated by the training program to define the initial state as including an event titled "Dry Run" that is scheduled to start on the date of Jul. 29, 2019 at a time of 2 pm and that has a duration of 2 hours.

Each annotated dialogue may include a set of one or more dialogue turns, each of which forms a respective subregion of the annotated dialogue. In this example, annotated dialogue 402 includes a set of 1 through N dialogue turns (e.g., 420, 430, 440), each including an input utterance (e.g., 422, 432, 442, respectively), a plan (e.g., 424, 434, 444, respectively), and a response utterance (e.g., 426, 436, 446, respectively). Response utterances 426, 436, and 446 are non-limiting examples of action 226 of FIG. 2. Input utterances, plans, and response utterances also form respective subregions of the annotated dialogue. Input utterances 422, 432, 442, etc. are examples of input utterance 132 of FIG. 1. Plans 424, 434, 444 etc. and response utterances 426, 436, 446, etc. are also examples of annotations 136 of FIG. 1.

Collectively, each dialogue turn corresponds to a respective annotated utterance that was labeled by a human annotator. Within dialogue turn 420, input utterance 422 includes: "update the Dry Run to 11 am". Accordingly, in the training example of annotated dialogue 402, a user has instructed (e.g., via input utterance 422) that a conversational computing system update the initial state of the event "Dry Run" from 2 pm to 11 am on the same day, in response to which plan 424 is to generate an action that includes updating the event in accordance with the user instruction and output a response utterance 426 that confirms that the event has been updated. For example, response utterance 426 to be provided by the conversational computing system in this training example includes: "okay, the Dry Run has been updated to start at 11 am".

Each plan of a dialogue turn may include or otherwise define a program fragment that includes one or more expressions. In this example, plans 424, 434, 444, etc. include or otherwise define expressions 428, 438, 448, etc. As one example, each plan may be created by a human annotator using an annotation programming language that is parsed and converted by the migration module or training program into a computer-executable expression having a different programming language. In the example depicted in FIG. 4, expression 428 is represented by an annotation programming language that includes the expression: "Describe ask update the only find Event with subject like "Dry Run". results. id with EVENT with start 11 am". In this example, the migration module or training program translates the annotation programming language into a different form for execution by a conversational computing system, within which find expressions may be identified and replaced with replacement expressions. In at least some examples, a user may view the translated form of the annotation programming language via a migration interface to easily provide a find expression to the migration module. In another example, each plan includes an expression in computer-executable form that does not utilize translation to another programming language.

For illustrative purposes, another example of a dialogue turn includes an input utterance of a human user that includes: "what is the day 2 days after July 4th?", an annotation defining a plan that includes the expression: "describe 2 days after July 4" as an example of annotation programming language, and a response utterance by a conversational computing system that includes: "On Monday, the date will be Jul. 6, 2020", such as where the annotated dialogue is seeded with an initial state in which the current date is within the year 2020.

Within the example of FIG. 4, dialogue turn 430 occurs after dialogue turn 420 within annotated dialogue 402 according to a logical order of data structure 400. Dialogue turn 430 provides an additional input/response training pair that arises following the input/response training pair of dialogue turn 420. In this example, a result of executing plan 424 of preceding dialogue turn 420 may be recorded in the annotated dialogue as response utterance 426 as well as within the updated event data so that it may be referenced to respond to subsequent input utterance 432. For example, input utterance 432 may include: "what time should I leave home to arrive at the Dry Run?". Within the logical order of data structure 400, the current state of the annotated dialogue when plan 434 is executed includes the event "Dry Run" starting at 11 am rather than 2 pm as initially set by preamble annotation 414. Therefore, in this example, response utterance 436 is provided in relation to the 11 am start time by including: "to make the Dry Run on time, you should leave home by 10:30 am" where the estimated travel time from the user's home to the location of the event is approximately 30 minutes.

In at least some examples, training program 124 of FIG. 1 may capture and store metadata associated with each annotated dialogue or other training example. An example of metadata associated with training dialogue 402 is depicted in FIG. 4 as including authors 452 (e.g., user identities) that created or edited the annotated dialogue, such as by labeling an utterance or preamble with an annotation that includes a program fragment. Metadata 450 in this example also includes timestamps 454 of events associated with the annotated dialogue, such as creation and editing of the annotated dialogue. Metadata 450 may further include descriptive tags 456 that are associated with subregions of the annotated dialogue. For example, tags 456 may include human annotations that do not include computer-executable code. Tags 456 may be applied to any of the various subregions of annotated dialogues, including the preamble, input utterances, plans, responses, dialogue turns, expressions, etc.

In at least some examples, training program 124 may index annotated dialogues or other training examples, and store the index within training data 134. Data contained within the index may enable searching and filtering of the annotated dialogues, as will be described in further detail with reference to FIG. 5.

Within data structure 400 of FIG. 4, the annotated dialogues and their various subregions such as the preamble annotation, dialogue turns, input utterances, plans, expressions, etc. may be delineated from each other by syntactic tokens or markers. For example, input utterances 422, 432, 442, etc. may take the form of metadata within training data 134 that is delineated from program fragments or other features of the training data by a particular character or sequence of characters (e.g., #or /*) as used by the particular programing language. Portions of training data 134 may be identified as forming part of the same program fragment based on structure (e.g., a tree structure) and syntactic tokens or markers, thereby enabling the migration module to identify a particular configuration of data as belonging to the same preamble annotation, plan, expression, dialogue turn, annotated dialogue, etc. As previously described with reference to method 300 of FIG. 3, a human migrator may target or limit replacement of find expressions to certain subregions and/or dialogues of training data.

Figure 5:
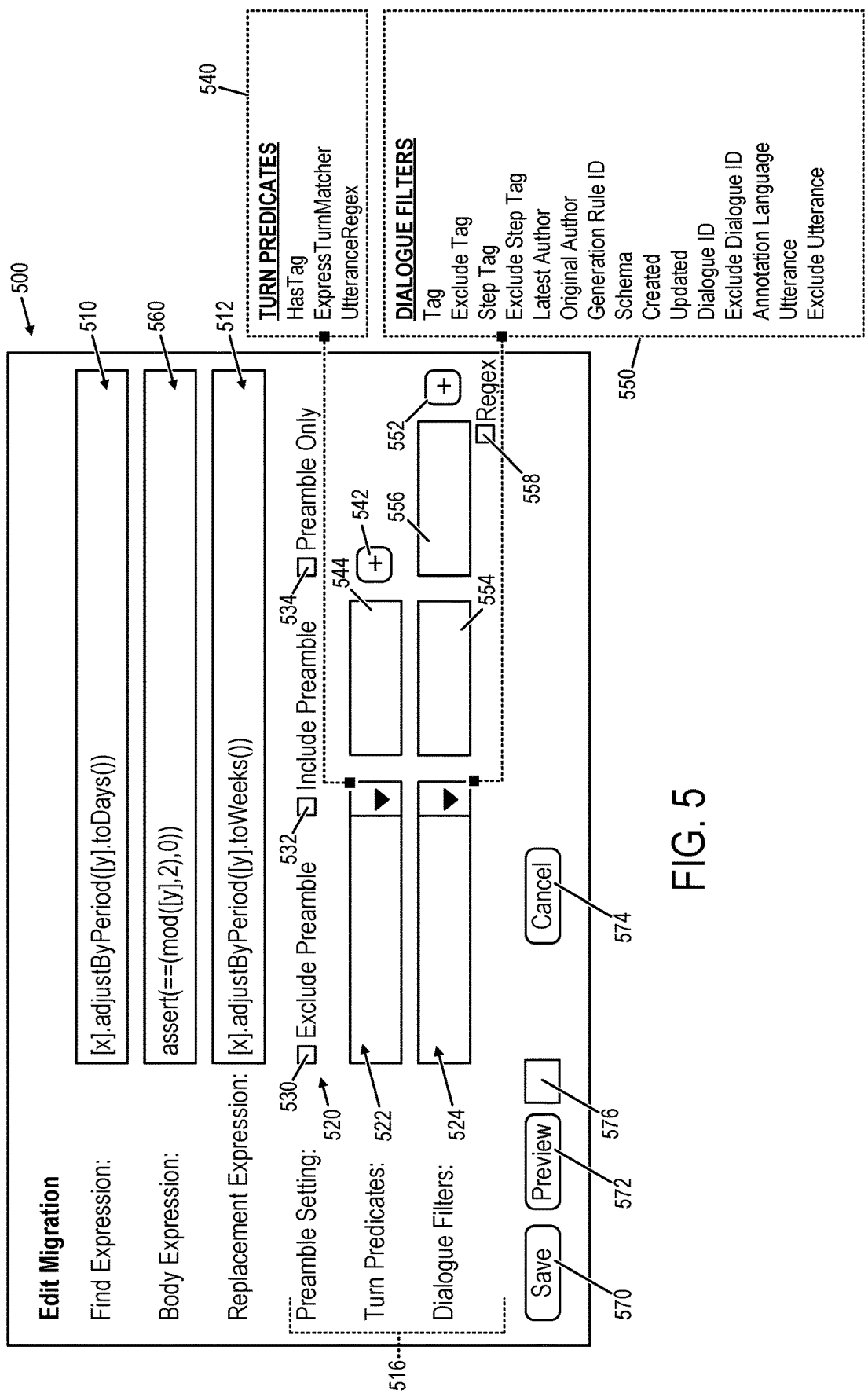
FIG. 5 shows a schematic diagram of an example migration editor interface of the training program of FIG. 1.

FIG. 5 shows a schematic diagram of an example migration editor interface 500. Migration editor interface 500 is an example of migration interface 142 of FIG. 1. In an example, migration editor interface 500 takes the form of one or more graphical user interfaces that are presented to a human migrator via a display of a computing system. However, migration editor interface 500 may take non-graphical forms.

Migration editor interface 500 includes a find expression field 510 by which a user may input a find expression, and a replacement expression field 512 by which a user may input a replacement expression that is to replace instances of the find expression within a set of training data. In at least some examples, the migration module may support the use of a find expression and/or replacement expression that includes a wildcard provided via find expression field 510 and/or replacement expression field 512. Wildcards may be used to adjust part of an annotation without changing other parts of the annotation by accessing expressions that are deeply nested within a programming tree structure. In an example, wildcards may take the form '[wildcardName]'. Wildcards in the replacement expression will replace the corresponding wildcard in the find expression.

As depicted in the example of FIG. 5, instances of the annotation "[x] days after [y]" within an annotation programming language (e.g., forming part of plan 444 of FIG. 4) are to be replaced with instances of the annotation "[x] weeks after [y]" in the annotation programming language. To enact this migration, the find expression field has been populated with the translated form "[x].adjustByPeriod([y].toDays( ))" of the annotation programming language (e.g., forming part of expression 448 of FIG. 4) and the replacement expression field has been populated with the translated form "[x].adjustByPeriod([y].toWeeks( ))". Following the migration, instances of the annotation "[x] days after [y]" will be replaced with instances of the annotation "[x] weeks after [y]". For example, an input utterance (e.g., 442 of FIG. 4) that includes: "what is the day 2 weeks after the Dry Run?" that is labeled with the replacement expression will generate a response in a trained machine learning model that provides the day two weeks after the Jul. 29, 2019 Dry Run event, rather than the day two days after the event using the pre-migration find expression.

Another example migration includes creating a constraint object to represent date ranges, instead of directly passing start/end times to each function in which the following find expression: EventAllDayDateThroughDate{event: [event], startDate: [start], endDate: [end]}.hla( ) is to be replaced by the following replacement expression: EventAllDayForDateRange{event: [event], dateRange: DateAndConstraint{date1: [start], date2: [end]}.hla( )}.ha( ).

Another example migration changes how the system searches for attendees of meetings. Previously, the system looked up the person using the name provided by the user, then searched for meetings with that specific person. This previous approach may be replaced with a search for meetings where any person has the name provided by the user using the following find expression: extensionConstraint(RecipientWithNameLike {constraint: StructConstraint[Recipient]{ }, name: [personName]}.hla( ).getSalient( ).execute( ).attendeeListHasRecipient( ) that is to be replaced by the following replacement expression: RecipientWithNameLike{constraint: StructConstraint [Recipient]{ }, name: [personName]}.hla( )attendeeListHasRecipientConstraint( ).

Migration editor interface 500 further includes a set of filtering constraint tools 516 that enable a user to input or otherwise set a filtering constraint that defines a combination of one or more filters and associated criteria. In this example, filtering constraint tools 516 include a preamble section 520, a turn predicates section 522, and a dialogue filters section 524 that collectively provide a plurality of curated filters that are selectable as the filtering constraint. It will be understood that filtering constraint tools 516 may include a different assortment of tools, and that users may add new filters in some examples.

The preamble section 520 enables a user to select among an exclude preamble setting 530, an include preamble setting 532, or a preamble only setting 534 to target different subregions of an annotated dialogue. If the exclude preamble setting 530 is selected, instances of the find expression input via find expression field 510 that are within preamble annotations (e.g., preamble annotation 414 of FIG. 4) of training examples are not identified as candidates for replacement by instances of the replacement expression provided via replacement expression field 512. If the include preamble setting 532 is selected, instances of the find expression that are within preamble annotations of training examples are identified as candidates for replacement by instances of the replacement expression. If the preamble only setting 534 is selected, instances of the find expression that are within preamble annotations are identified as candidates for replacement by instances of the replacement expression, but instances of the find expression residing outside of the preamble annotations are not identified as candidates for replacement by instances of the replacement expression.

The turn predicates section 522 enables a user to select among a set of turn predicates 540 that may be individually added by a user (e.g., via add selector 542). Each turn predicate enables a user to specify predicates as filters that are applied to individual dialogue turns (e.g., 420, 430, and 440) of the annotated dialogues, thereby enabling a user to target particular subregions of an annotated dialogue. In this example, the set of turn predicates 540 includes HasTag, ExpressTurnMatcher, and UtteranceRegex, which are described in further detail below. Depending on the turn predicates that are selected, one or more additional fields 544 may be provided to enable a user to define criteria associated with each selected turn predicate.

The dialogue filters section 524 enables a user to select among a set of dialogue filters 550 that may be individually added by a user (e.g., via add selector 552). Dialogue filters enable a user to target entire annotated dialogues or portions thereof outside of the dialogue turn construct. Examples of the dialogue filters 550 are described in further detail below. Depending on the dialogue filters 550 that are selected, one or more additional fields 554, 556, 558, etc. may be provided to enable a user to define criteria associated with each selected dialogue filter. Regex selector field 558 depicted in FIG. 5 affects certain filters that are searching over string values. If this field 558 is active, the filter applies to a regular expression over those values. For example, tags on a dialogue are a collection of key=value pairs, where each value is a string. Selecting the Regex selector field 558, for example, would enable a user to write a tag filter such as "foo=a.*" and have that match the tags "foo=abc", "foo=a", etc. In this example, the "*" serves as a wildcard.

In an example implementation of filtering constraint tools 516, all previously-annotated training examples in a set of training data are initially considered as candidates for migration in the absence of a filtering constraint set by a user via filtering constraint tools 516. Within the context of annotated dialogues being used as training examples, all instances of the find expression within the annotated dialogues of a set of training data are candidates for replacement by the replacement expression unless filtering constraint tools 516 are used to target a specific subset of the annotated dialogues or specific subregions thereof. Continuing with this example, one or more dialogue filters set via dialogue filters section 524 are applied first by the migration module to filter all annotated dialogues of the set of training data to those annotated dialogues that pass the combination of dialogue filters and their associated criteria set via the dialogue filters section 524. In at least some examples, the selected dialogue filters may be AND-ed together by the migration module to require that the annotated dialogues targeted for migration pass the criteria associated with all of the selected dialogue filters. Next, one or more turn predicates and their associated criteria set via turn predicates section 522 are applied to the annotated dialogues that pass the one or more dialogue filters to filter the dialogue turns (e.g., 420, 430, and 440 of FIG. 4) of those annotated dialogues to the dialogue turns that pass the criteria associated with one or more turn predicates. In at least some examples, the selected turn predicates may be AND-ed together by the migration module to require that the annotated dialogues and their dialogue turns targeted for migration pass the criteria associated with all of the selected turn predicates. Turn predicates section 522 does not apply to the preamble annotation (e.g., 414 of FIG. 4) of the annotated dialogues, because the preamble annotations are not dialogue turns. The migration is then applied to remaining dialogue turns of annotated dialogues that pass both the dialogue filter section 524 and the turn predicates section 522 so that each instance of the find expression within the remaining dialogue turns is replaced by an instance of the replacement expression. Dialogue turns that do not include the find expression will not be modified by the migration.

Migration editor interface 500 may include a body expression field 560 by which a user may input a body expression. The body expression, if provided by the user, provides that the body expression must be evaluated successfully for the instance of the find expression to be identified as a candidate for replacement by the replacement expression. If not evaluated successfully, the find expression will not be identified as a candidate for replacement by the replacement expression. In an example, a body expression may be used to restrict the previous migration example (in which days were changed to weeks) to only migrate instances of the find expression for utterances in which the number of days is even. Accordingly, in this example, body expression field 560 of FIG. 5 is populated with the expression "assert(== (mod([y],2),0))" to make assertions on the values matched by the wildcard in the find expression field.

Migration editor interface 500 may include a save selector 570, a preview selector 572, and a cancel selector 574 that may be selected via user input. Upon selection of save selector 570, data input to the various fields and the filtering constraint tools selected by the user via migration editor interface 500 (collectively "migration data") may be saved to a migration file to be used by the migration module to migrate a set of training data. Upon selection of cancel selector 574, data input to the various fields and filtering constraint tools selected by the user via migration editor interface 500 are not saved or committed to a migration file.

Upon selection of preview selector 572, a migration preview interface may be provided that presents a change to a previewed portion of the subset of the previously-annotated training examples by replacement of one or more instances of the find expression with one or more instances of the replacement expression. The migration preview interface enables the user to test and inspect how the migration performed with respect to the previewed portion of the subset using the filtering constraints set via migration editor interface 500. The previewed portion may represent less than the entire subset of previously-annotated training examples that would be updated by replacement of instances of the find expression with instances of the replacement expression by migration of the subset. In at least some examples, migration editor interface 500 may further include a preview constraint tool 576 that enables a user to define a preview constraint that limits an aspect of the previewed portion of the migration. For example, the preview constraint may limit the previewed portion to a particular quantity of updates to the training data, an amount of updated data, a quantity of updated annotated dialogues, a computer runtime for conducting the previewed migration, a page count for displaying results, etc. Given that some migrations of training data may take hours or days for a computing system to implement, the ability for a user to preview a result of the migration of a limited portion of the training data enables the user to test the migration and receive feedback more quickly than migrating the entire set of training data. Preview constraint tool 576 may take any suitable form, including a data field, a pull down menu, a graphical variable control element (e.g., a graphical slider or knob), or other suitable tool by which a user may define a preview constraint. An example of a migration preview interface is described in further detail with reference to FIG. 6.

Referring again to the set of turn predicates 540, the HasTag turn predicate may be used to target dialogue turns which are determined a priori and have tags applied to them. The migration can then target that specific tag (e.g., as specified criteria in field 544). A reason for this turn predicate is that the find expression for some migrations may not be sufficiently flexible to express the set of conditions that are to be targeted. For example, a developer may write an ad-hoc migration that operates on the dialogue state, testing dialogue turns against more complex conditions and applying tags to then target by use of a find expression that is matched to instances of the replacement expression.

The ExpressTurnMatcher turn predicate enables a user to filter down to dialogue turns which match a given expression and meet the conditions specified in the body field for any extracted wildcards. Dialogue turns are checked against the find expression provided in this filter and must match in order for the migration to be run on the dialogue turns.

The UtteranceRegex turn predicate enables a user to filter down to dialogue turns which contain user utterances that match a provided regular expression within the find expression field.

Referring again to the dialogue filters section 524, the set of dialogue filters 550 include Tag, Exclude Tag, Step Tag, Exclude Step Tag, Latest Author, Original Author, Generation Rule ID, Schema, Created, Updated, Dialogue ID, Exclude Dialogue ID, Annotation Language, Utterance, and Exclude Utterance, as examples of dialogue filers. These dialogue filters may correspond to indexed data fields stored in the training data following an indexing process applied to the annotated examples.

The Tag dialogue filter may be used to include annotated dialogues as being within the subset of training examples within which instances of the find expression are candidates for replacement by instances of the replacement expression. This dialogue filter is used to target any set of dialogues which are determined apriori and have tags applied to them. The migration can then target that specific tag. Similar to the HasTag turn predicate, the Tag dialogue filter can be used when the targeting condition is too complex to express in the find expression field. The tags of each dialogue may be manually assigned by human annotators or programmatically by a computer program.

The Exclude Tag dialogue filter may be used to exclude annotated dialogues from the subset of training examples within which instances of the find expression are candidates for replacement by instances of the replacement expression.

The Step Tag dialogue filter may be used to include annotated dialogues as being within the subset of training examples within which instances of the find expression are candidates for replacement by instances of the replacement expression. The Step Tag dialogue filter is similar to the HasTag turn predicate, except that this dialogue filter has the semantic of "true if any turn matches" rather than checking every turn individually.

The Exclude Step Tag dialogue filter may be used to exclude annotated dialogues from the subset of training examples within which instances of the find expression are candidates for replacement by instances of the replacement expression.

The Latest Author dialogue filter may be used to include annotated dialogues that have been last edited by a particular user as being within the subset of training examples within which instances of the find expression are candidates for replacement by instances of the replacement expression. This dialogue filter enables a human migrator to target training examples last edited by a particular human annotator as provided via field 554.

The Original Author dialogue filter may be used to include annotated dialogues that were originally created or edited by a particular user as being within the subset of training examples within which instances of the find expression are candidates for replacement by instances of the replacement expression. This dialogue filter enables a human migrator to target training examples originally created or edited by a particular human annotator as provided via field 554.

The Generation Rule ID dialogue filter may be used to include annotated dialogues that use a specified generation rule as being within the subset of training examples within which instances of the find expression are candidates for replacement by instances of the replacement expression.

The Schema dialogue filter may be used to include annotated dialogues that use a specified macro or function that abstracts a set of expressions as being within the subset of training examples within which instances of the find expression are candidates for replacement by instances of the replacement expression.

The Created dialogue filter may be used to include annotated dialogues that were created in a certain time period as being within the subset of training examples within which instances of the find expression are candidates for replacement by instances of the replacement expression. This dialogue filter enables a human migrator to target training examples created by a human annotator within a particular time range as provided via field 554.

The Updated dialogue filter may be used to include annotated dialogues that were updated or otherwise edited in a certain time period as being within the subset of training examples within which instances of the find expression are candidates for replacement by instances of the replacement expression. This dialogue filter enables a human migrator to target training examples updated or otherwise edited by a human annotator within a particular time range as provided via field 554.

The Dialogue ID dialogue filter may be used to include annotated dialogues having a particular dialogue identifier or range of identifiers as being within the subset of training examples within which instances of the find expression are candidates for replacement by instances of the replacement expression. This dialogue filter enables a human migrator to target training examples individually by their respective identifiers as provided via field 554.

The Exclude Dialogue ID dialogue filter may be used to exclude annotated dialogues having a particular dialogue identifier or range of identifiers from the subset of training examples within which instances of the find expression are candidates for replacement by instances of the replacement expression. This dialogue filter enables a human migrator to target training examples for exclusion from the subset of training examples by their respective identifiers as provided via field 554.

The Annotation Language dialogue filter may be used to include annotated dialogues having a particular keyword within the annotation language as being within the subset of training examples within which instances of the find expression are candidates for replacement by instances of the replacement expression. This dialogue filter enables a human migrator to target training examples by keywords contained within annotations as provided via field 554.

The Utterance dialogue filter may be used to include annotated dialogues having a particular keyword within the input utterance subregion of the annotated dialogues as being within the subset of training examples within which instances of the find expression are candidates for replacement by instances of the replacement expression. This dialogue filter enables a human migrator to target training examples by keywords contained within input utterances as provided via field 554.

The Exclude Utterance dialogue filter may be used to exclude annotated dialogues having a particular keyword within the input utterance subregion of the annotated dialogues from the subset of training examples within which instances of the find expression are candidates for replacement by instances of the replacement expression. This dialogue filter enables a human migrator to target training examples for exclusion by keywords contained within input utterances as provided via field 554.

Figure 6:
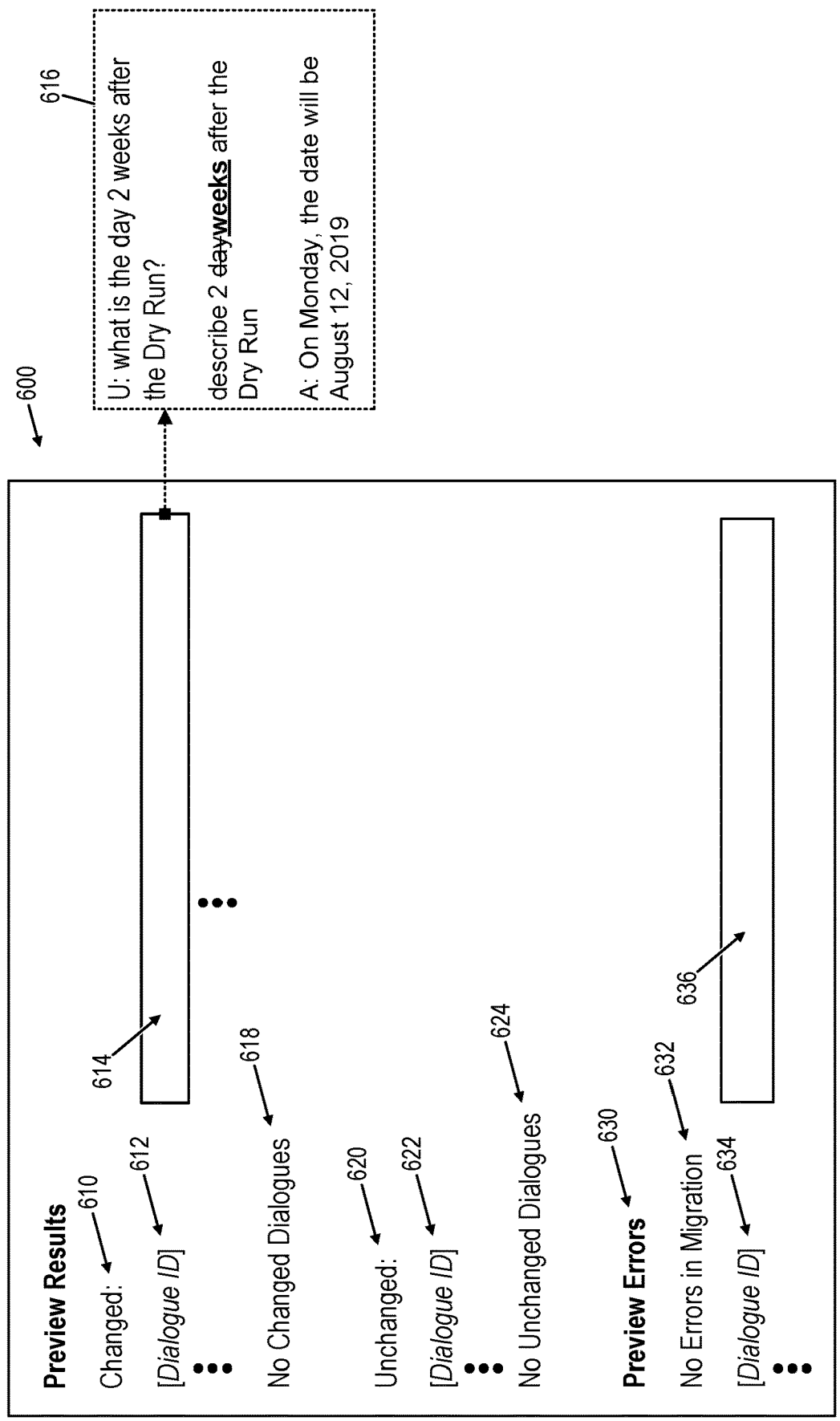
FIG. 6 shows a schematic diagram of an example migration preview interface of the training program of FIG. 1.

FIG. 6 shows a schematic diagram of an example migration preview interface 600 of training program 124 of FIG. 1. Migration preview interface 600 is another example of migration interface 142 of FIG. 1. As previously described with reference to FIG. 5, migration preview interface 600 may be generated and presented in response to a user selecting the preview selector 572 of migration editor interface 500.

Migration preview interface 600 includes a changed results section 610 within which annotated dialogues that have been provisionally changed by the previewed migration may be presented for review by a user along with the details of those provisional changes. In the example depicted in FIG. 6, changed results section 610 provides a list of one or more annotated dialogues that contain a provisional change in which each annotated dialogue is identified by a dialogue identifier indicated at 612 with an associated change summary window 614 that enables a user to review provisional changes to the annotated dialogue. An example of provisional changes to an annotated dialogue are depicted at 616. In this example, changes to the annotation with the annotation programming language are shown in strike-through for deletions, and underline and bold for additions to the annotation. If the previewed migration results in no provisionally changed dialogues, an indication of this result may be presented at 618.

Migration preview interface 600 further includes an unchanged results section 620 within which annotated dialogues that have not been provisionally changed by the previewed migration may be presented for review by a user, for example, by each annotated dialogue being identified by a dialogue identifier indicated at 622. If the previewed migration results in no provisionally unchanged dialogues, an indication of this result may be presented at 624.

Migration preview interface 600 further includes a preview errors section 630 within which provisional errors that result from the previewed migration may be presented for review by a user. In at least some examples, the migration module may support error checking that is run as part of generating the preview. If no provisional errors result from the previewed migration, an indication of this result may be presented at 632. In the example depicted in FIG. 6, preview errors section 630 provides a list of one or more annotated dialogues that contain errors in which each annotated dialogue is identified by a dialogue identifier indicated at 634 with an associated error summary window 636 that enables a user to review provisional errors to the annotated dialogue.

Figure 7:
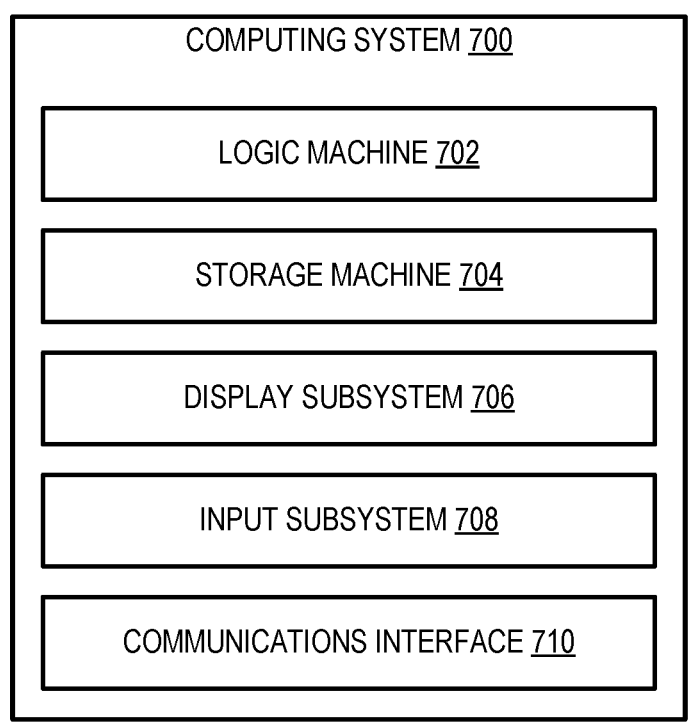
FIG. 7 shows a schematic diagram of an example computing system.

FIG. 7 schematically shows a simplified representation of a computing system 700 configured to provide any to all of the compute functionality described herein. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 700 includes a logic machine 702 and a storage machine 704. Computing system 700 may optionally include a display subsystem 706, input subsystem 708, communication subsystem 710, and/or other subsystems not shown in FIG. 7.

Logic machine 702 includes one or more physical devices configured to execute instructions. For example, the logic machine may be configured to execute instructions that are part of one or more applications, services, or other logical constructs. The logic machine may include one or more hardware processors configured to execute software instructions. Additionally, or alternatively, the logic machine may include one or more hardware or firmware devices configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely-accessible, networked computing devices configured in a cloud-computing configuration.

Storage machine 704 includes one or more physical devices configured to temporarily and/or permanently hold computer information such as data and instructions executable by the logic machine. When the storage machine includes two or more devices, the devices may be collocated and/or remotely located. Storage machine 704 may include volatile, nonvolatile, dynamic, static, read/write, read-only, random-access, sequential-access, location-addressable, file-addressable, and/or content-addressable devices. Storage machine 704 may include removable and/or built-in devices. When the logic machine executes instructions, the state of storage machine 704 may be transformed—e.g., to hold different data.

Aspects of logic machine 702 and storage machine 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic machine and the storage machine may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients or formants). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, or band-pass filters. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When included, display subsystem 706 may be used to present a visual representation of data held by storage machine 704. This visual representation may take the form of a graphical user interface (GUI). Display subsystem 706 may include one or more display devices utilizing virtually any type of technology. In some implementations, display subsystem 706 may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example of the present disclosure, a method performed by a computing system executing program instructions for adapting previously-annotated training examples into updated training examples for training an artificial intelligence system, comprises: recognizing a find expression; recognizing a replacement expression; recognizing a filtering constraint distinguishing a subset of the previously-annotated training examples from others of the previously-annotated training examples; identifying an instance of the find expression within the subset of the previously-annotated training examples identified among the previously-annotated training examples based on the filtering constraint; replacing the instance of the find expression identified within the subset of the previously-annotated training examples with an instance of the replacement expression to obtain an updated subset of training examples; and outputting the updated subset of training examples. In this or any other example, the method further comprises training a machine learning language model with the updated subset of training examples. In this or any other example, a training example of the subset of the previously-annotated training examples includes an utterance labeled with a program fragment including an instance of the find expression; and the updated subset of training examples includes the utterance labeled with an updated program fragment including an instance of the replacement expression that replaces the instance of the find expression. In this or any other example, to obtain the updated subset of training examples, the method further comprises: identifying each instance of the find expression within the subset of the previously-annotated training examples; and replacing each instance of the find example identified within the subset with an instance of the replacement expression. In this or any other example, the method further comprises: providing a migration preview interface that presents a change to a previewed portion of the subset of the previously-annotated training examples by replacement of one or more instances of the find expression with one or more instances of the replacement expression prior to outputting the updated subset of training examples. In this or any other example, the previewed portion represents less than the entire subset of updated training examples that are updated by replacement of instances of the find expression with instances of the replacement expression. In this or any other example, the method further comprises identifying the subset of the previously-annotated training examples among the previously-annotated training examples based on the filtering constraint. In this or any other example, the filtering constraint identifies a target subregion of the previously-annotated training examples; the subset of the previously-annotated training examples each includes an instance of the find expression within the target subregion of the previously-annotated training example of the subset; and the method further comprises replacing each instance of the find expression within the target subregion of the subset of previously-annotated training examples with an instance of the replacement expression. In this or any other example, the target subregion includes a preamble subregion or a program fragment subregion that labels an utterance of the previously-annotated training examples. In this or any other example, the filtering constraint identifies a target subregion of the previously-annotated training examples and a keyword; and the subset of the previously-annotated training examples each includes the keyword within the target subregion of the previously-annotated training example of the subset. In this or any other example, the method further comprises replacing the instance of the find expression with the instance of the replacement expression within a different subregion of the previously-annotated training example of the subset that is associated with the target subregion. In this or any other example, the target subregion includes an utterance subregion; and the different subregion includes an annotation subregion of the utterance subregion. In this or any other example, the find expression includes a wildcard. In this or any other example, the method further comprises providing a migration interface, wherein recognizing the find expression, the replacement expression, and the filtering constraint includes receiving user input via the migration interface that defines the find expression, the replacement expression, and the filtering constraint. In this or any other example, the migration interface includes a set of curated filters that are selectable for the filtering constraint. In this or any other example, the set of curated filters includes one or more subsets of filters that are applied to different respective subregions of the previously-annotated training examples; and a first subregion to which a first subset of the filters are applied defines a dialogue turn of an annotated dialogue that includes an input utterance and an annotation. In this or any other example, a second subregion to which a second subset of the filters are applied includes a preamble of the annotated dialogue, a program fragment of the annotation, or the input utterance.

In another example of the present disclosure, a storage machine holding instructions executable by a logic machine is disclosed in which the instructions include instructions to recognize a find expression; instructions to recognize a replacement expression; instructions to recognize a filtering constraint distinguishing a subset of the previously-annotated training examples from others of the previously-annotated training examples; instructions to identify a subset of previously-annotated training examples among previously-annotated training examples based on the filtering constraint; instructions to identify an instance of the find expression within the subset of the previously-annotated training examples, a training example of the subset of the previously-annotated training examples including an utterance labeled with a program fragment including the instance of the find expression; instructions to replace the instance of the find expression identified within the subset of the previously-annotated training examples with an instance of the replacement expression to obtain an updated subset of training examples that includes the utterance labeled with an updated program fragment including an instance of the replacement expression; and instructions to output the updated subset of training examples. In this or any other example, the instructions of the storage machine further comprise instructions to train a machine learning model with the updated subset of training examples.

In another example of the present disclosure, a computing system of one or more computing devices, comprises: a logic machine; and a storage machine holding instructions executable by the logic machine to: provide a migration interface that includes a find expression field, a replacement expression field, and a set of one or more filtering constraint tools; recognize a find expression as a user input received via the find expression field; recognize a replacement expression as a user input received via the replacement expression field; recognize a filtering constraint as a user input received via the set of filtering constraint tools, the filtering constraint distinguishing a subset of the previously-annotated training examples from others of the previously-annotated training examples; identify a subset of previously-annotated training examples among previously-annotated training examples based on the filtering constraint; identify an instance of the find expression within the subset of the previously-annotated training examples, a training example of the subset of the previously-annotated training examples including an utterance labeled with a program fragment including the instance of the find expression; replace the instance of the find expression identified within the subset of the previously-annotated training examples with an instance of the replacement expression to obtain an updated subset of training examples that includes the utterance labeled with an updated program fragment including an instance of the replacement expression; and output the updated subset of training examples.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system executing program instructions for adapting previously-annotated training examples into updated training examples for training an artificial intelligence system, the method comprising:
  recognizing a filtering constraint identifying a target subregion of the previously annotated training examples that distinguishes a subset of the previously-annotated training examples from others of the previously-annotated training examples;
  identifying an instance of a find expression within the subset of the previously-annotated training examples identified among the previously-annotated training examples based on the filtering constraint;
  replacing the instance of the find expression identified within the subset of the previously-annotated training examples with an instance of a replacement expression within a different subregion of the subset of previously-annotated training examples from the target subregion to obtain an updated subset of training examples;
  wherein the different subregion includes a first program fragment of computer-executable code that is associated with the target subregion, and the target subregion includes an utterance or a second program fragment of computer-executable code; and
  outputting the updated subset of training examples.

2. The method of claim 1, further comprising training a machine learning language model with the updated subset of training examples.

3. The method of claim 1, wherein the different subregion is an annotation of the target subregion.

4. The method of claim 3, wherein the target subregion is the utterance that is associated with the annotation.

5. The method of claim 1, wherein the target subregion includes the second program fragment.

6. The method of claim 1, wherein the target subregion includes the utterance.

7. The method of claim 1, wherein to obtain the updated subset of training examples, the method further comprises:
identifying each instance of the find expression within the different subregion of each previously-annotated training example of the subset; and
replacing each instance of the find expression identified within the different subregion of each previously-annotated training example of the subset with an instance of the replacement expression.

8. The method of claim 1, further comprising:
providing a migration preview interface that presents a change to a previewed portion of the subset of the previously-annotated training examples by replacement of one or more instances of the find expression with one or more instances of the replacement expression prior to outputting the updated subset of training examples.

9. The method of claim 8, wherein the previewed portion represents less than the entire subset of updated training examples that are updated by replacement of instances of the find expression with instances of the replacement expression.

10. The method of claim 1, further comprising:
identifying the subset of the previously-annotated training examples among the previously-annotated training examples based on the filtering constraint.

11. The method of claim 1, further comprising:
recognizing the filtering constraint, the find expression, and the replacement expression based on user input received via the computing system.

12. The method of claim 1, wherein the filtering constraint identifies the different subregion and a keyword; and
wherein the subset of the previously-annotated training examples each includes the keyword within the different subregion of that previously-annotated training example of the subset.

13. The method of claim 1, wherein the find expression includes a wildcard.

14. A storage machine holding instructions executable by a logic machine of a computing system for adapting previously-annotated training examples into updated training examples for training an artificial intelligence system, the instructions comprising:
instructions to recognize a filtering constraint identifying a target subregion of the previously annotated training examples that distinguishes a subset of the previously-annotated training examples from others of the previously-annotated training examples;
instructions to identify an instance of a find expression within the subset of the previously-annotated training examples identified among the previously-annotated training examples based on the filtering constraint;
instructions to replace the instance of the find expression identified within the subset of the previously-annotated training examples with an instance of a replacement expression within a different subregion of the subset of previously-annotated training examples from the target subregion to obtain an updated subset of training examples;
wherein the different subregion includes a first program fragment of computer-executable code that is associated with the target subregion, and the target subregion includes an utterance or a second program fragment of computer-executable code; and
instructions to output the updated subset of training examples.

15. The storage machine of claim 14, wherein the instructions further comprise instructions to train a machine learning language model with the updated subset of training examples.

16. The storage machine of claim 14, wherein the target subregion is the utterance and the different subregion is an annotation of the utterance.

17. The storage machine of claim 14, wherein to obtain the updated subset of training examples:
each instance of the find expression is identified within the different subregion of each previously-annotated training example of the subset; and
each instance of the find expression identified within the different subregion of each previously-annotated training example of the subset is replaced with an instance of the replacement expression.

18. The storage machine of claim 14, wherein the instructions further comprise instructions to:
recognize the filtering constraint, the find expression, and the replacement expression based on user input received via the computing system.

19. A computing system of one or more computing devices for adapting previously-annotated training examples into updated training examples for training an artificial intelligence system, the computing system comprising:
a logic machine; and
a storage machine holding instructions executable by the logic machine to:
recognize a filtering constraint identifying a target subregion of the previously annotated training examples that distinguishes a subset of the previously-annotated training examples from others of the previously-annotated training examples;
identify an instance of a find expression within the subset of the previously-annotated training examples identified among the previously-annotated training examples based on the filtering constraint;
replace the instance of the find expression identified within the subset of the previously-annotated training examples with an instance of a replacement expression within a different subregion of the subset of previously-annotated training examples from the target subregion to obtain an updated subset of training examples;
wherein the different subregion includes a first program fragment of computer-executable code that is associated with the target subregion, and the target subregion includes an utterance or a second program fragment of computer-executable code; and
output the updated subset of training examples.

20. The computing system of claim 19, wherein the instructions are further executable by the logic machine to:
train a machine learning language model with the updated subset of training examples.

* * * * *